March 6, 1928.

B. A. LINDERMAN 1,661,295

FLUID PRESSURE DEVICE

Filed Oct. 17, 1924

Inventor:
Bert A. Linderman
By Munday, Clarke & Carpenter Attys.

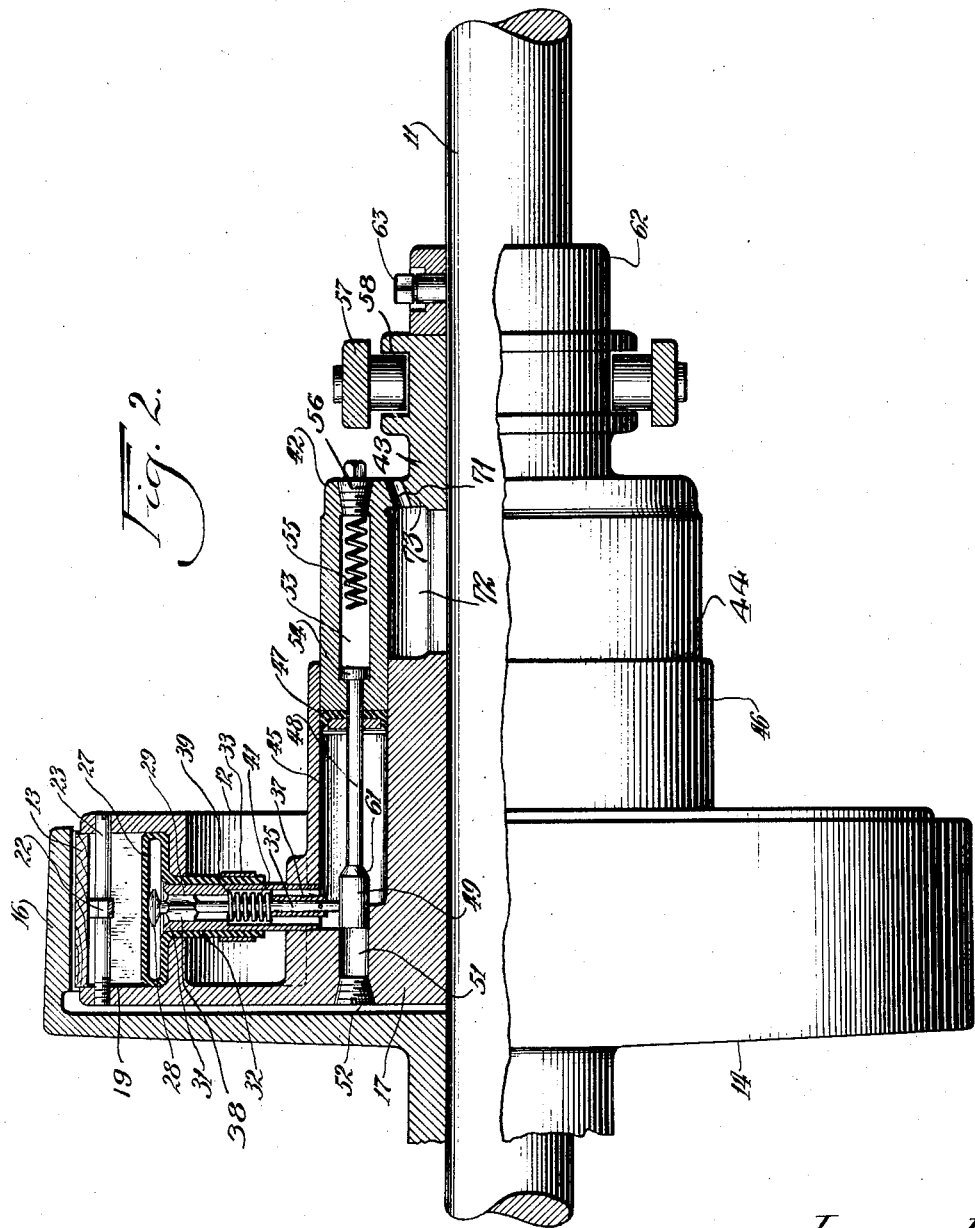

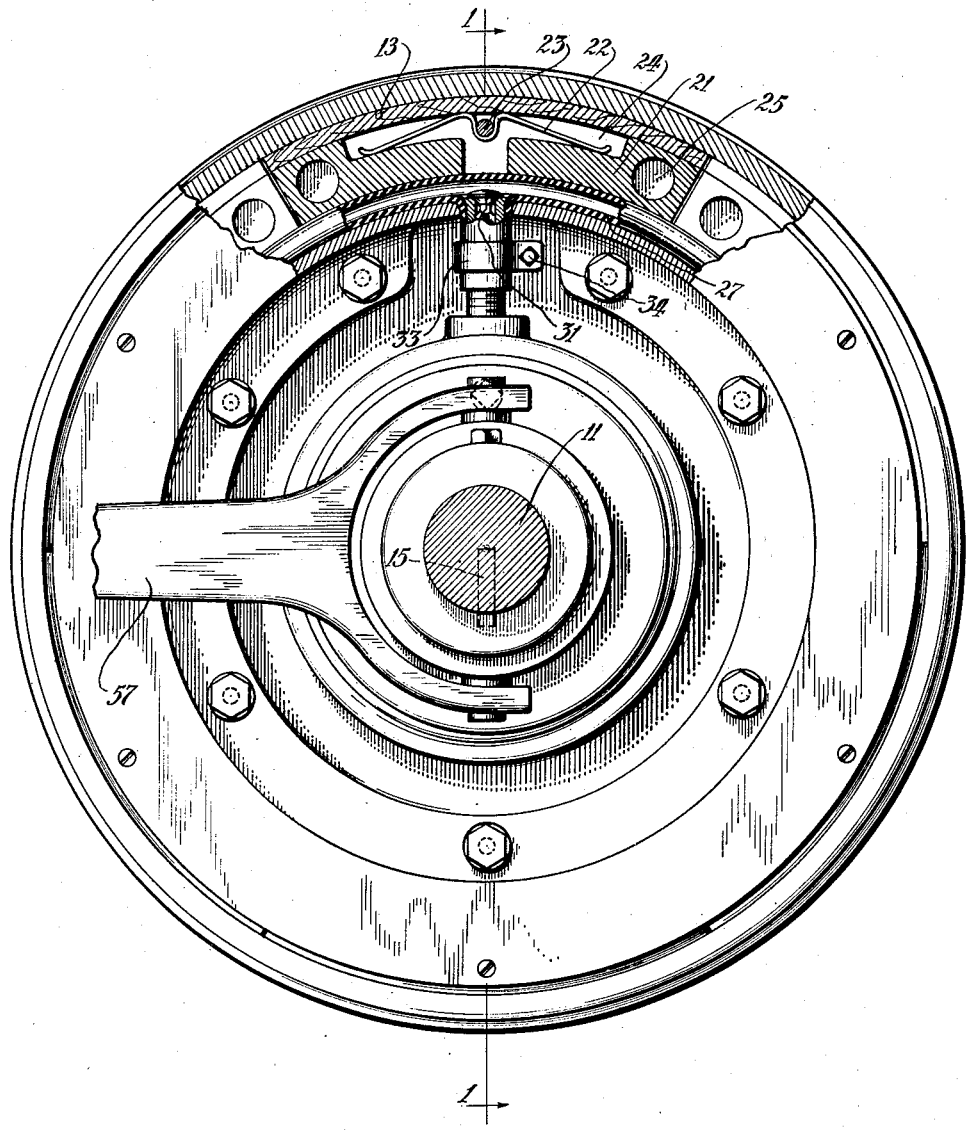

Patented Mar. 6, 1928.

1,661,295

UNITED STATES PATENT OFFICE.

BERT A. LINDERMAN, OF NEW YORK, N. Y., ASSIGNOR TO LINDERMAN & COMPANY, OF WILMINGTON, DELAWARE, A CORPORATION OF DELAWARE.

FLUID-PRESSURE DEVICE.

Application filed October 17, 1924. Serial No. 744,111.

My invention relates to clutch or brake mechanism, and more particularly to mechanism of this character which is operated by air, or other fluid pressure.

A primary object of the invention is the provision of a fluid operated clutch, or brake, in which the inflatable tube is supplied with fluid by means of a self-contained pump directly associated therewith, and without requiring any outside source of pressure.

Another important object is to provide such a device wherein the operating means is also the pressure generating means so that small and delicate parts that are likely to become damaged will not be required.

Another important object is to provide such a device with a pressure generating means that may be controlled to receive fluid exhausted from the inflatable tube, and to retain the fluid so that the same fluid may be used repeatedly to prevent the accumulation of dust particles or the like within the apparatus.

Another important object is to provide such a device with an operating means that may be controlled to generate fluid pressure and to cause the retention of the fluid pressure within the inflatable tube, or expansible member, and to release and receive the fluid upon the release of the brake or clutch.

Another object of my invention resides in providing a construction of the above character wherein the pump and the positively operated valve for forcing fluid into the member to be inflated or deflated, are constructed so that the pump when operated will positively open the valve or optionally, the pump can be operated to force air past the valve without positively opening the same thereby permitting extra strokes of the pump to be made to force an extra amount of air into the inflatable member in case of wear at the friction shoes.

Numerous other objects and advantages of the invention will be apparent as it is better understood from the following description, which, taken in connection with the accompanying drawings, discloses a preferred embodiment thereof.

Referring to the drawings,

Fig. 2 is a view partially in section and partially in side elevation of said clutch, showing the parts in position with the valve open; and Fig. 3 is a face elevation, partially broken away and shown in section, and taken from the right, viewing Figs. 1 and 2.

Figure 1:
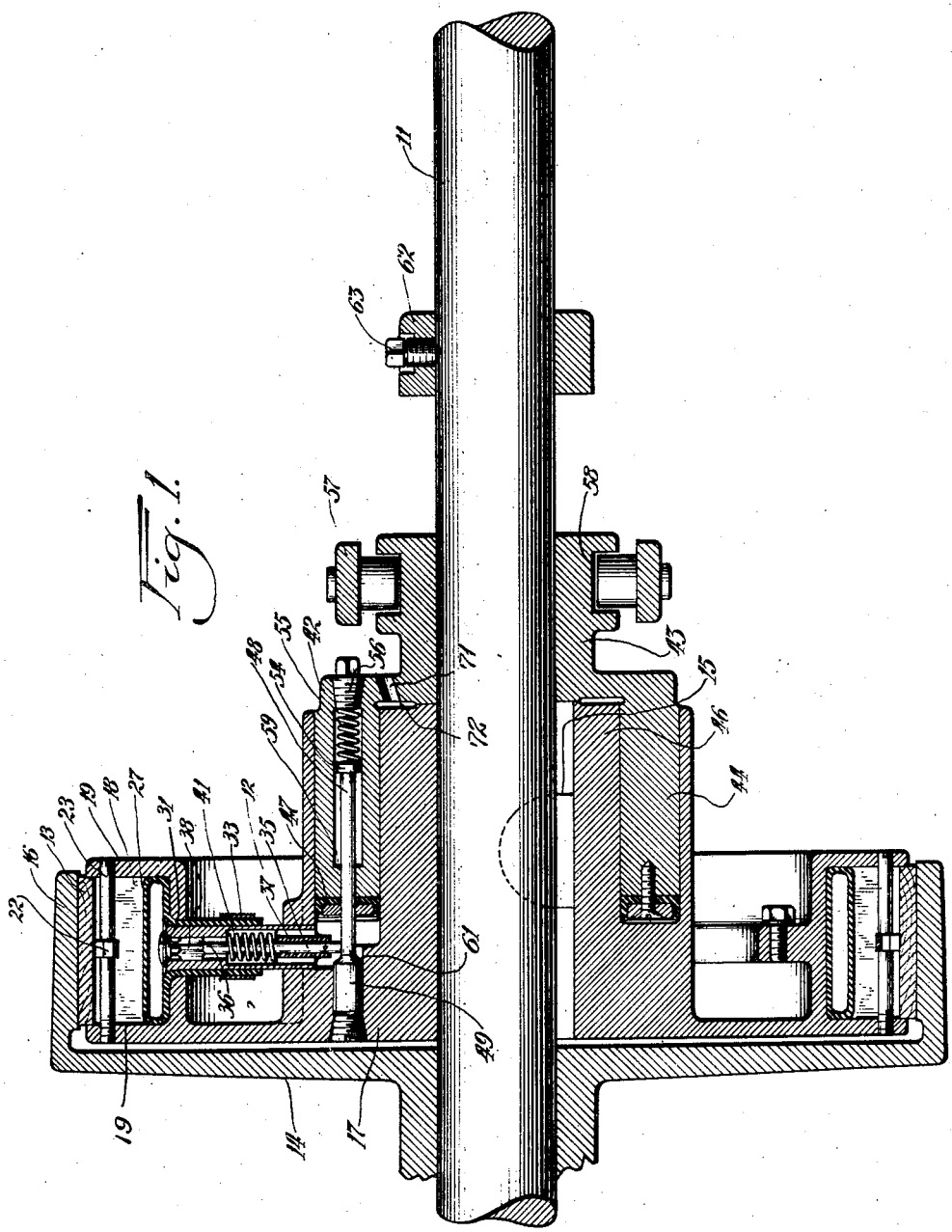
Figure 1 is a sectional view of a clutch in which my invention is embodied, taken longitudinally of the driving shaft and substantially on the section line 1—1 in Fig. 3.

For the purpose of illustrating my invention, I have shown upon said drawings a portion of a shaft 11 upon which a clutch embodying the principles of my invention is mounted, said clutch consisting primarily of an inner unit 12 having a friction surface 13 and an outer friction member 14, the inner unit, in the present instance, being preferably keyed to the shaft, as indicated at 15, and the outer friction member 14 being loose on said shaft and provided with a flange 16 adapted to cooperate with the friction surface, or lining 13 on the inner unit 12 to effect driving engagement. It must be apparent that while the invention is disclosed in connection with a clutch it is equally applicable to a brake.

Said inner unit 12 comprises a main body, or support, 17 provided at its outer edge with a peripheral channel 18 between spaced walls 19, a plurality of segments 21, of wood or other non-heat-conducting material, being disposed in said channel and being normally pressed inwardly by means of springs 22 having their central portions bent about fixed pins 23 positioned in and extending between the walls 19. Said springs are disposed in recesses 24 in said segments and the segments are provided with apertures 25 to further reduce the heat-conductivity thereof. The friction surface 13 is provided by surfacing or lining members individualized to each segment and formed of asbestos, or other usual lining material.

Said segments are adapted to be moved radially by means of an inflatable actuator preferably in the form of a tube 27, of rubber or the like, disposed inwardly of said segments and supported by the base of the channel 18. Said tube is adapted to be inflated to effect driving or braking engagement between the friction members in a manner to be now described.

A valve 28 is disposed in a tube, or sleeve, 29 which is formed to provide a valve seat 31 and is arranged within a nipple 32 in the tube 27, said parts being embraced and held together by means of a collar 33 having its ends clamped together at 34. Said valve has a stem 35 upon which are mounted two collars 36 and 37, having radially extending guiding flanges 38, which permit the fluid to pass to the valve stem in said tube 29. Said tube is provided medially with a shoulder 39 and a spring 41 surrounds the valve stem, bearing at one end against said shoulder and at the opposite end against the collar 37, this spring tending to hold the valve in closed position.

For the purpose of operating the valve 28 and supplying fluid to the tube 27 and exhausting it therefrom, I employ a piston 42, having at the rear end thereof a collar 43, slidably mounted upon the shaft 11, said piston having a forwardly extending cylindrical portion 44, slidable within a chamber 45 formed in a rearwardly extending portion 46 of the support 17, said piston being provided with packing rings 47, of leather or other suitable material, at the forward end thereof. One or more openings 71 is preferably provided in the piston 42 and arranged to establish communication between the atmosphere and a chamber 72, when the main portion of the piston is joined to the hub portion 43 by a web 73 as shown. It will be understood, however, that the above mentioned portions of the piston may be connected by suitable spokes if desired.

A rod 48 protrudes from the piston 42 and has a forward enlarged end 49 disposed in an opening 51 in said support 17, which opening is adapted to be closed by means of a screw 52. The rear end of the rod is disposed in an opening 53 in the piston 42 and is formed with an enlargement 54, backing against a spring 55 disposed in said opening and the opening being closed by means of a screw 56. The piston 42 is adapted to be shifted in any suitable manner, as by a lever 57, engaging in a groove 58 in the collar 43.

The operation of the device may now be described, attention being called first to Fig. 1, showing the parts in position with the tube 27 inflated and the clutch engaged. To disengage said clutch, the piston 42 may be shifted toward the right, viewing Figs. 1 and 2. This provides space in the chamber 45 into which the fluid from the tube may be exhausted and after the piston has moved a predetermined distance, a shoulder 59, at the forward end of the opening 53, engages the enlargement 54 on the rod 48, after which said rod is shifted to the right, as shown in Fig. 2. A cam surface 61 is provided upon said rod and acts upon the inner end of the valve stem 35 to unseat said valve and permit exhaust of the fluid into the chamber 45. A fixed stop 62 is secured to the shaft 11 by means of a set screw 63 and serves to limit the stroke of said piston. When it is desired to connect the clutch, or apply the brake (it being understood that the device is usable either as a clutch or brake), the piston is shifted toward the left, viewing Figs. 1 and 2, until the enlarged portion 49 of the rod 48 is moved from beneath the valve stem 35, permitting the valve to be seated by the action of the spring 41. This movement also forces the fluid out of the chamber 45 and into the tube 27, inflating the latter and causing the segments 21 to move radially outward to effect frictional engagement between the lining on the inner unit 12 and the inner surface of the flange 16 on the outer unit 14. If sufficient pressure is not obtained by the first stroke of the piston, another stroke can be made, care being taken, however, to limit the stroke so that the valve will not be unseated. The fit between the parts 44 and 46 may be sufficiently loose so that on the backward stroke of the piston air may leak into the chamber in advance thereof, the packing ring 47 being of such form as to permit leakage on the backward, but not on the forward stroke.

When the device is used as a brake, one of the elements, preferably the inner unit, as shown in the drawings, is of course mounted on a stationary support and the other element, which would normally be the brake drum corresponding to the member 14, would be mounted to rotate about said stationary unit. The operation of the pump would obviously be the same whether the unit including the same be rotatable or stationary. By reference to Figures 1 and 2 it will be apparent that by leaving the valve actuator 49 in the position shown in Figure 1 and reciprocating the pump piston 42 a limited amount, an extra amount of fluid will be forced by the pump past the normally spring closed valve 35 and into the inflatable tube. In other words the pump itself may be actuated independently of any movement of the valve operating member 49 so that the valve 35 will not be positively opened but will only be opened by an excess of pressure in the pump chamber. This provides a very ingenious means for forcing an excess pressure into the inflatable tube should the friction surfaces wear.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A fluid pressure device comprising two members operatively associated to rotate relatively or to remain relatively at rest, devices for controlling said members including an inflatable actuator, a pump for forcing fluid into and out of said actuator, and a valve for controlling the passage of fluid to or from said actuator and means for operating the valve upon movement of the pump.

2. A fluid pressure device comprising two members operatively associated to rotate relatively or to remain relatively at rest, devices for controlling said members including an inflatable actuator, manually actuatable means for inflating the actuator; a valve for controlling the passage of fluid to or from said actuator and means for positively actuating said valve, said means being operated by said manually actuatable means.

3. A fluid pressure device comprising two members operatively associated to rotate relatively or to remain relatively at rest, devices for controlling said members including an inflatable actuator, a pump for forcing fluid to said actuator, a valve controlling the passage of said fluid to or from said actuator and means for positively operating said pump and for positively operating said valve from said pump.

4. A fluid pressure device comprising two members adapted to be moved relatively or adapted to remain relatively at rest, an inflatable tube for modifying their relative rotation, a valve for admitting fluid pressure medium from a source within the device itself to said tube, and a slidable member mounted for operation of said valve.

5. A fluid pressure mechanism, comprising a shaft, driving and driven members on said shaft, an inflatable tube for effecting driving engagement between said members, a valve for admitting fluid pressure medium from a source within the clutch itself to said tube, and a slidable cam member mounted for operation of said valve.

6. A fluid pressure mechanism comprising two friction members capable of relative rotation or capable of being at rest relatively, movable segments, an inflatable tube for shifting said segments, a valve for admitting fluid pressure medium from a source within the device itself to said tube, spring means tending to hold said valve closed, and shiftable means for unseating said valve to permit inflation and deflation of the tube.

7. A fluid pressure mechanism, comprising a first friction member, a second friction member, movable segments, an inflatable tube for expanding said segments, a valve for admitting a fluid pressure medium to said tube, spring means tending to hold said valve closed, and shiftable means for unseating said valve to permit inflation and deflation of the tube, said shiftable means including a pump adapted, when shifted in one direction, to force the pressure medium into said tube and, when shifted in the opposite direction, to exhaust it therefrom.

8. A fluid pressure mechanism, comprising a first friction member, a second friction member, movable segments, an inflatable tube for expanding said segments, a valve for admitting a pressure medium to said tube, spring means tending to hold said valve closed, and shiftable means for unseating said valve to permit inflation and deflation of the tube, said shiftable means including a pump adapted, when shifted in one direction, to force the pressure medium into said tube and, when shifted in the opposite direction, to provide a chamber into which said pressure medium may exhaust.

9. A fluid pressure mechanism, comprising a shaft, a first friction member, a second friction member, movable segments, an inflatable tube for expanding said segments, a valve for admitting fluid pressure medium from a source within the clutch itself to said tube, spring means tending to hold said valve closed, and shiftable means on said shaft for unseating said valve to permit inflation and deflation of the tube.

10. A fluid pressure mechanism, comprising a first friction member, a second friction member, movable segments, an inflatable tube for expanding said segments, a valve for admitting a pressure medium to said tube, spring means tending to hold said valve closed, a valve stem, a shiftable member adapted to act upon said valve stem to open the valve, and a piston for operating said member and having movement relative thereto to provide a chamber into which the pressure medium may exhaust when the valve is open and from which it may be expelled by action of said piston to inflate the tube.

11. A fluid pressure device comprising two members operatively associated to rotate relatively or to remain relatively stationary, means forming a closed fluid containing chamber, an inflatable actuator connected to said chamber for controlling said members, a pump operable in said chamber and a valve shiftable in said chamber and means for actuating said pump and valve for controlling the inflation and deflation of said actuator.

12. A fluid pressure device comprising two members operatively associated to rotate relatively or to remain relatively stationary, an inflatable actuator for controlling the relation of said members, a pump for inflating and deflating said actuator, a valve for controlling the inlet to and exhaust from said actuator and means for positively actuating said valve by the movement of said pump or for permitting the actuation of said pump without positively operating said valve.

13. A fluid pressure device comprising two members operatively associated to rotate relatively or to remain relatively stationary, means forming a pump chamber, an inflatable actuator communicating with said chamber, a spring pressed valve normally closing said communication, a pump in said chamber, means actuated by said pump positively for opening said valve on the pumping stroke, said means being constructed and arranged for permitting said valve opening means to remain inoperative when the pump is actuated.

14. A fluid pressure device comprising two members operatively associated to rotate relatively or to remain relatively stationary, means forming a pump chamber, an inflatable actuator connected therewith, a valve normally spring pressed to close said connection, a pump for forcing fluid through said connection, a valve opening device and a lost motion connection between said pump and said valve opening device for causing the pump positively to open the valve when the pump is actuated or to permit said pump to force air past the valve and against the tension of its spring into said actuator and without positively opening said valve.

15. In a device of the class described the combination of two members operatively associated to rotate relatively or to remain relatively stationary, one of said members being provided with a pump chamber and a pump adapted to reciprocate in said chamber, said member also having an inflatable tube and a connection therefrom to said pump chamber, a valve mounted in said connection and held spring pressed to its seat, a rod extending longitudinally through said pump chamber and having a valve actuating surface adapted to be shifted into and out of contact with said valve stem to positively actuate the latter, and means forming a lost motion connection between said pump and said valve actuating mechanism, said means being constructed and arranged positively to shift the valve actuating mechanism in either direction upon the actuation of the pump in the corresponding direction.

16. In a device of the class described, the combination of a shaft, two members operatively mounted on said shaft, one concentrically within the other and associated to rotate relatively or to remain relatively stationary, said members being constructed and arranged to provide a concentric channel therebetween, a concentrically arranged series of friction shoes mounted in said channel, an inflatable actuator mounted in said channel adjacent said shoes for operating them and a pump connected to said actuator, said pump being directly mounted on that portion of the inner concentric member which immediately surrounds the shaft.

BERT A. LINDERMAN.